(12) United States Patent
Ediger (10) Patent No.: US 11,350,748 B2
(45) Date of Patent: Jun. 7, 2022

(54) DESKTOP FAN CLAMP (71) Applicant: VORNADO AIR, LLC, Andover, KS (US)

(72) Inventor: Glen Ediger, North Newton, KS (US)

(73) Assignee: Vornado Air, LLC, Andover, KS (US)

( * ) Notice: Subject to any disclaimer, the term of this patent is extended or adjusted under 35 U.S.C. 154(b) by 0 days.

(21) Appl. No.: 17/192,823

(22) Filed: Mar. 4, 2021

(65) Prior Publication Data
US 2022/0061532 A1 Mar. 3, 2022

Related U.S. Application Data (63) Continuation-in-part of application No. 29/748,708, filed on Aug. 31, 2020.

(51) Int. Cl.
| | |
|---|---|
| A47B 96/06 | (2006.01) |
| A47B 97/00 | (2006.01) |
| F04D 29/64 | (2006.01) |
| F16B 2/12 | (2006.01) |
| F16M 13/02 | (2006.01) |

(52) U.S. Cl.
CPC ............ A47B 97/00 (2013.01); F04D 29/646 (2013.01); F16B 2/12 (2013.01); F16M 13/022 (2013.01); A47B 2200/0085 (2013.01); A47B 2200/06 (2013.01)

(58) Field of Classification Search
CPC ................ A47B 97/00; A47B 2200/06; A47B 2200/0085; F04D 29/646; F16B 2/12; F16M 13/022

USPC ............. 248/231.41, 229.2, 229.26, 231.51, 248/226.11, 228.6, 228.3, 229.15, 229.22, 248/229.25, 231.71; 416/246
See application file for complete search history.

(56) References Cited

U.S. PATENT DOCUMENTS

| | | | |
|---|---|---|---|
| D282,491 S | 2/1986 | Doyel | |
| 4,799,858 A * | 1/1989 | Shin-Chin | F16M 11/2014 416/246 |
| 4,850,804 A * | 7/1989 | Huang | F16M 13/022 416/246 |
| 5,547,343 A * | 8/1996 | Jane | F04D 29/601 416/246 |
| 5,842,671 A * | 12/1998 | Gibbs | F16M 11/2014 248/311.2 |

(Continued)

*Primary Examiner* — Todd M Epps
(74) *Attorney, Agent, or Firm* — Avyno Law P.C.

(57) ABSTRACT

A fan clamp is provided for supporting a fan on a support surface by clamping to the support surface. The fan clamp includes a clamp assembly having an upper clamp member for engaging a top side of the support surface, a lower clamp member for engaging a bottom side of the support surface and a screw adjustment assembly extending through the lower and upper clamp members for clamping the upper clamp assembly and lower clamp assembly to the support surface. The clamp assembly further includes a shield extending from the lower clamp assembly through the upper clamp assembly that partially surrounds the screw adjustment assembly to block the screw adjustment assembly from being visible when the lower and upper clamp assemblies move away from each other to engage a support surface. The fan clamp may further include an arm extending from the clamp assembly for supporting the fan. The arm may be a swing arm that is rotativity connected to the fan clamp.

18 Claims, 6 Drawing Sheets

(56) References Cited

U.S. PATENT DOCUMENTS

| | | | | |
|---|---|---|---|---|
| 6,886,270 B2* | 5/2005 | Gilmer | ............... | F04D 29/601 |
| | | | | 34/239 |
| 6,957,795 B1* | 10/2005 | Hsieh | ............... | F16M 13/022 |
| | | | | 248/316.4 |
| D638,696 S | 5/2011 | Kubota | | |
| D675,312 S | 1/2013 | Zhu et al. | | |
| D902,374 S | 11/2020 | Li | | |
| 2019/0295446 A1* | 9/2019 | Hung | ............... | F16M 13/022 |

* cited by examiner

DESKTOP FAN CLAMP

CROSS REFERENCE TO RELATED APPLICATIONS

This application claims priority to U.S. Design patent application Ser. No. 29/748,708, filed Aug. 31, 2020 titled Fan Clamp, which application is incorporated in its entirety by reference into this application.

FIELD OF INVENTION

The invention relates to a clamp for attaching a fan to a desk, counter, table, shelf, or other surface.

BACKGROUND

Often, it is desirable to attach a fan to the edge of a desk, counter, table, shelf, or other flat surface. This requires a clamping device to secure the fan to the edge of the support surface of the object. Typically, clamping a fan or other device to the edge of a support surface involves the uses of a clamp designed to resemble, or be based upon the principle of, a clip or more commonly a C-clamp mechanism. These types of clamps may be referred to as a table clamp. These clamps are often unattractive and utilitarian looking, having exposed parts, such as bolts and screws.

While it remains desirable to clamp a fan to the edge of a tabletop or desk to minimize clutter and free the space consumed by the fan, current solutions remain unattractive, clunky and do not allow for the easy adjustment of the direction of air flow from the fan. A need therefore exists for a fan clamp that is functional, yet aesthetically pleasing, while allowing for the fan head to pivot and/or swivel about the fan clamp.

SUMMARY

The present invention relates to a fan clamp design such that all mechanical elements are contained within the clamp and not visible in any application. The fan clamp of the present invention is provided for supporting a fan on a support surface by clamping to the support surface. The fan clamp includes a clamp assembly having an upper clamp member for engaging a top side of the support surface, a lower clamp member for engaging a bottom side of the support surface and a screw adjustment assembly extending through the lower and upper clamp assembly for clamping the upper clamp assembly and lower clamp assembly to the support surface. The clamp assembly further includes a shield extending from the lower clamp assembly through the upper clamp assembly that partially surrounds the screw adjustment assembly to block the screw adjustment assembly from being visible when the lower and upper clamp assemblies move away from each other to engage a support surface. The fan clamp may further include an arm extending from the clamp assembly for supporting a fan. The arm may be a swing arm that is rotatably connected to the fan clamp. Further, the upper and lower clamp assembly may each include a non-slip pad surface.

The shield of the fan clamp may be, for example, a C-shaped tubular member or a shield shaped tube. The upper clamp assembly may further include a cylindrical member for enclosing the shield and screw as they extend through the upper clamp assembly. The arm may include a sleeve rotatably coupled to the outer circumference of the cylindrical member so that the arm may swivel about the cylindrical member.

In accordance with another example of an implementation of the invention, the fan clamp includes a screw adjustment assembly where the screw adjustment assembly has a screw attached at one end to an adjustment knob. The fan clamp further includes a lower clamp member having a lower plate with a lower pad affixed to the upper surface of the lower plate and a C-shaped tubular member positioned behind the lower pad on the upper surface of the lower plate. The C-shaped tubular member is positioned to surround an opening in the lower plate for receiving the screw of the screw adjustment assembly from the underside of the lower plate of the lower clamp member. An upper clamp member positioned opposite the lower clamp member is also provided that includes an upper plate having an upper pad affixed to the lower surface of the upper plate, the upper clamp member further including a cylindrical member positioned on top side of the upper plate, the cylindrical member includes a C-shaped channel for receiving the C-shaped tubular member and a shaft for engaging the screw of the screw adjustment assembly. The rotation of the adjustment knob moves the screw through the shaft of the cylindrical member which, when turned in one direction, moves the lower clamp member toward the upper clamp member and, which when turned in the opposing direction, moves the lower clamp member away from the upper clamp member.

In this example, the cylindrical member may include a threaded insert surrounding a portion of the shaft for engaging the screw of the screw adjustment assembly. The fan clamp may further include a swing arm having a sleeve rotatably coupled to the outer circumference of the cylindrical member of the upper clamp. A fan attachment may also be provided for pivotally attaching a fan to the end of the swing arm positioned away from the upper clamp member. The adjustment knob and cylindrical member of the upper clamp may further be axially aligned longitudinally, and the lower pad and upper pad may be comprised of, or include, a non-slip surface. For cord management, the fan clamp may also include a cord cleat on the upper clamp member, for example, positioned on the cylindrical member or on the upper plate of the upper clamp member.

In yet another example of an implementation of the invention, a fan clamp is provided that includes (i) a screw attached at one end to an adjustment knob; (ii) a lower plate having a lower non-slip pad attached on the top surface of the lower plate, where the lower plate includes an opening for receiving the screw; and (iii) an upper plate member having an upper non-slip pad attached on the bottom surface of the upper plate, where the upper plate further includes a threaded shaft for receiving the screw. The fan clamp further includes a shield positioned on the lower plate surrounding the opening for receiving the screw where the shield is taller than the thickness of the lower plate with lower non-slip pad and upper plate with upper non-slip pad, where the upper plate further includes a channel opening for receiving the shield such that the shield remains extended between the upper and lower plate as the plates move toward and away from one another to engage a support surface.

The fan clamp may further include a cylindrical member positioned on the top of the upper plate for receiving the shield as it extends through the channel opening on the upper plate and the screw as it extends through the threaded shaft. A swing arm may further be coupled to the outer circumference of the cylindrical member with a sleeve so that the swing arm may swivel about the fan clamp. A fan attachment may further be attached to the end of the swing arm positioned away from the cylindrical member for attaching a fan to the end of the swing arm. The upper plate may further include an opening for receiving the screw where the threaded shaft is positioned above the opening. The thread shaft may further be a threaded insert. The upper plate member may also include a cord cleat for cord management.

Other devices, apparatus, systems, methods, features and advantages of the invention are or will become apparent to one with skill in the art upon examination of the following figures and detailed description. It is intended that all such additional systems, methods, features and advantages be included within this description, be within the scope of the invention, and be protected by the accompanying claims.

DESCRIPTION OF FIGURES

The invention may be better understood by referring to the following figures. The components in the figures are not necessarily to scale, emphasis instead being placed upon illustrating the principles of the invention.

DETAILED DESCRIPTION OF THE INVENTION

As illustrated in the attached FIGS. 1-6, a fan clamp 100 is provided for supporting a fan 102 on the edge of support surface 104, such as a desk, counter, table, shelf or other surface, to minimize the amount of space taken up by the fan 102 on the surface 104. The fan clamp 100 is constructed to allow the fan 102 to be adjustable about the fan clamp 100, to move and angle the face 110 of the fan 102 up, down and side-to-side, and to also allow for the horizontal adjustment of the fan 102 over and away from the support surface 104. The fan clamp 100 design of the present invention allows for the screw adjustment mechanism 204 (FIG. 2) of the fan clamp 100 to be contained with the body of the fan clamp 100.

Figure 1:
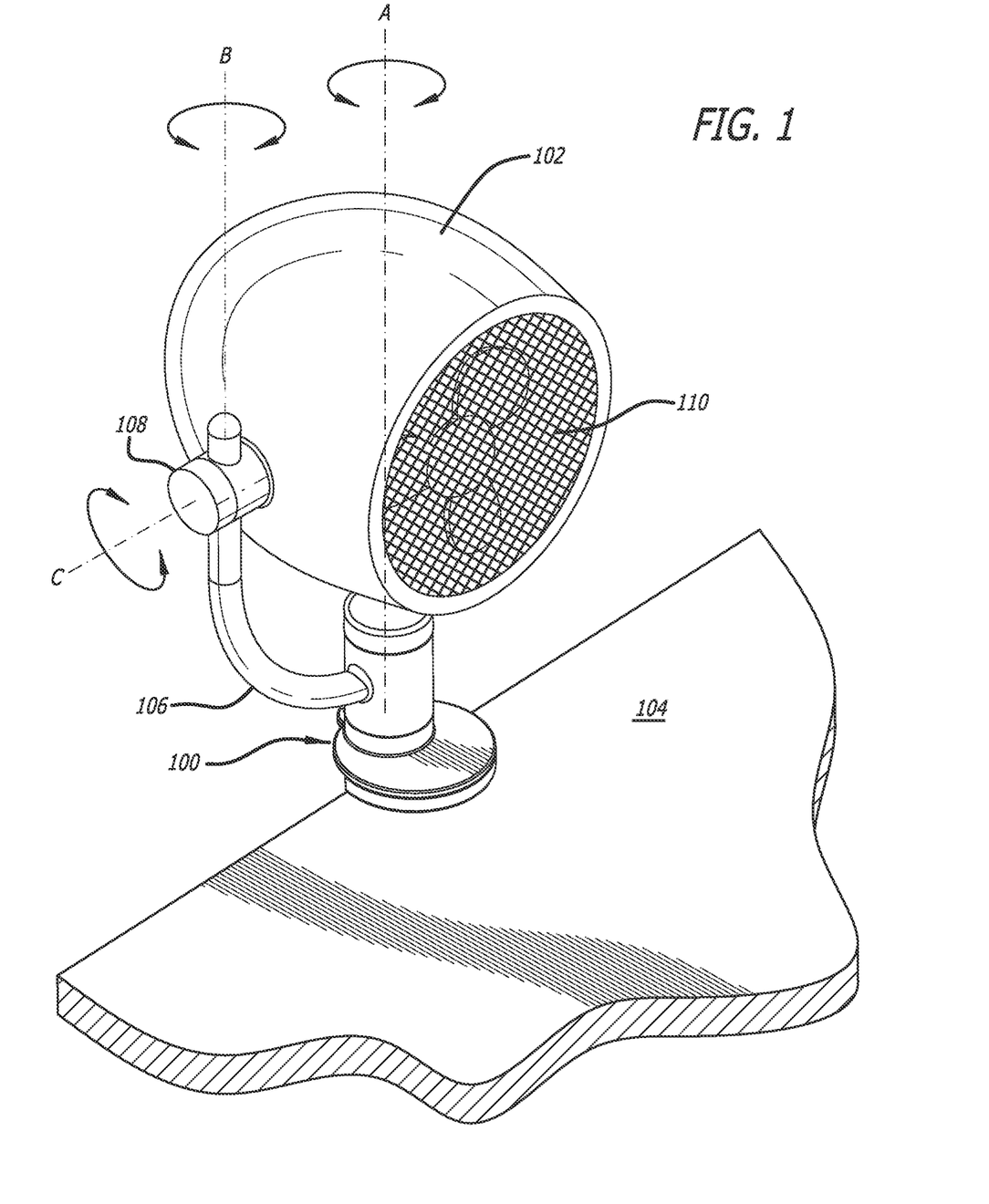
FIG. 1 illustrates a front view of one example of a fan clamp of the present invention supporting a fan and attached to the edge of a support surface.

In particular, FIG. 1 illustrates a front view of one example of an implementation of a fan clamp 100 supporting a fan 102 and on the edge of a support surface 104. As seen in FIG. 1, the fan clamp 100 further includes a swing arm 106. Swing arm 106 extends between the fan clamp 100 and the fan 102, with the swing arm 106 attached at one end to the fan clamp 100 at its other end to the fan 102. In this example, the fan 102 is pivotally attached to the swing arm 106 using a fan attachment 108. The design of the fan attachment 108 and swing arm 106 may vary for different products and/or product configurations.

In this example, the fan 102 may be rotated horizontally about axis A, which allows the fan 102 to rotate about the fan clamp 100. In certain applications, the fan 102 may also be rotated horizontally about axis B, which rotates the fan 102 about the swing arm 106. With the example fan attachment 108 used in this implementation, the fan 102 may also be rotated about the axis C, which rotates the face 110 of the fan 102 vertically up and down.

Figure 2:
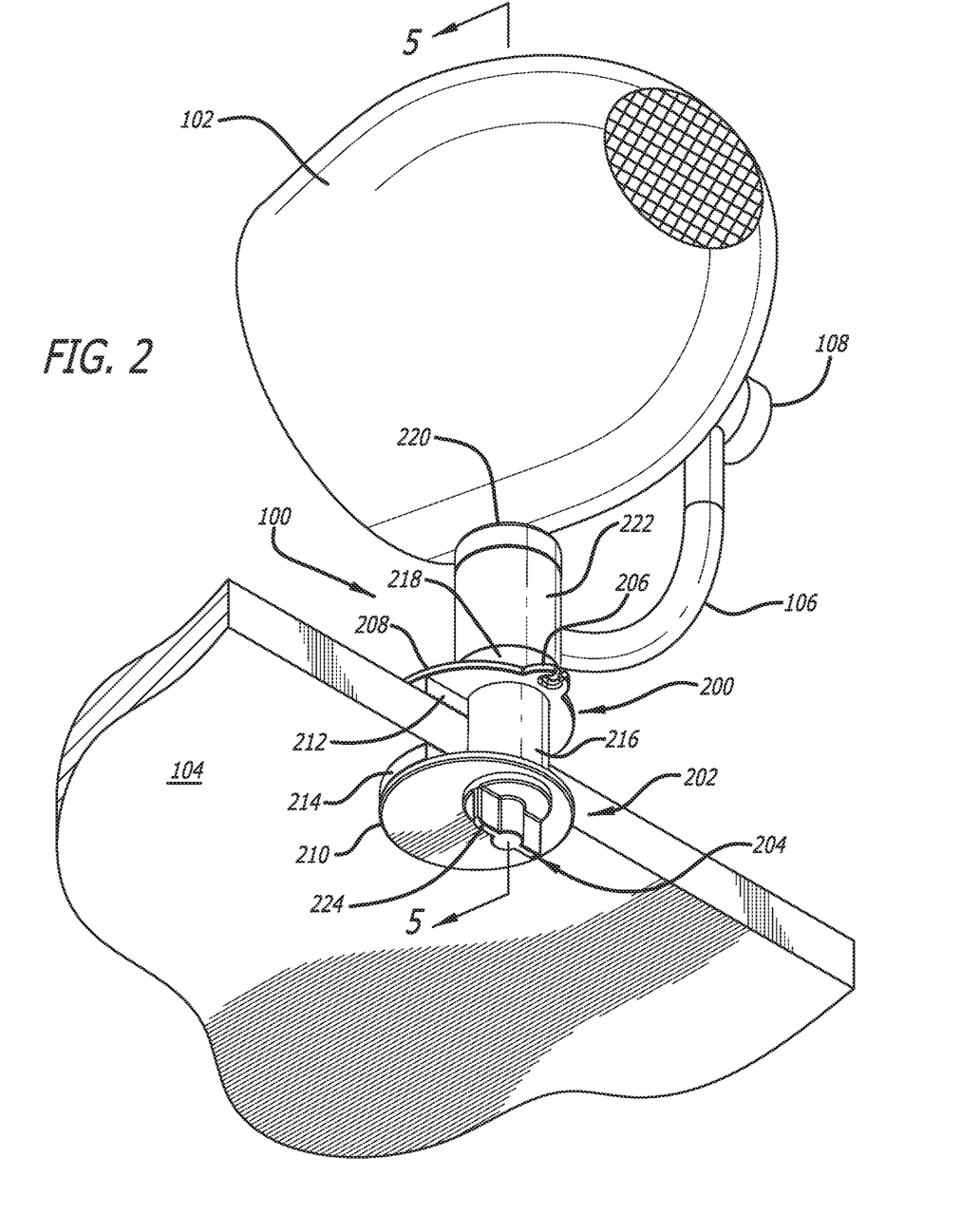
FIG. 2 illustrates a rear view of the fan clamp of FIG. 1 being attached to a support surface.

FIG. 2 illustrates a rear view of the fan clamp 100 of FIG. 1 being attached to a support surface 104. As illustrated in FIG. 2, the fan clamp 100 has an upper clamp member or upper clamp assembly 200, a lower clamp member or lower clamp assembly 202 and screw adjustment mechanism or screw adjustment assembly 204. The upper clamp member or assembly 200, lower clamp member or assembly 202 and the screw adjustment mechanism or assembly 204 may be referred to as the clamp member or clamp assembly.

The upper clamp member 200 includes a upper plate 208 having an upper pad area with an upper pad 212 attached to the underside of the upper plate 208 on the upper pad area. The upper pad 212 is designed to rest against the top of the support surface 104 to which the fan clamp 100 attaches. This upper pad 212 may be made of, or covered with, a soft non-slip material.

The lower clamp member 202 includes a lower plate 210 having a lower pad area with a lower pad 214 attached to the top side of the lower plate 210 on the lower pad area. The lower pad 214 is designed to rest against the bottom of the support surface 104 to which the fan clamp 100 attaches. This lower pad 214 may be made of, or covered with, a soft non-slip material.

The upper clamp member 200 further includes a cylindrical member 218 attached to, or integrated with, the upper surface of the upper plate 208. As demonstrated further in connections with FIGS. 4-6, the upper plate 208 and cylindrical member 218 are designed to receive the screw 402 (FIG. 4) of the screw adjustment mechanism 204. Similarly, the lower clamp member 202 includes a shield or shield member 216, which may be, for example, a C-shaped tube member or half pipe shaped tube, attached to top of the lower plate 210 behind the lower pad 214. The shield 216 is of a smaller circumference then cylindrical member 218 such that the shield 216 may be received within the walls of the cylindrical member 218. The shield 216 is designed to conceal the screw 402 of the screw adjustment mechanism 204 during use of the fan clamp 100.

The cylindrical member 218 on the upper clamp member 200 further includes an outer recessed portion of uniform height about its circumference. In this example, the swing arm 106 includes a sleeve 222 which is rotatably mounted within the recessed portion of the cylindrical member 218 to permit the swing arm 106 to rotate about the axis A (FIG. 1). The upper clamp member 200 further includes a cap 220 position on top of the cylindrical member 218 above the sleeve 222 to maintain the sleeve 222 on the cylindrical member 218.

Positioned below the lower plate 210 is an adjustment knob 224. As explained further below, the turning or rotation of the adjustment knob 224 by a user causes the fan clamp 100 to move from a closed to open position, and from an open to clamping position. Also as illustrated on FIG. 2, the upper clamp member 200 may include a cord cleat 206 for cord management.

Figure 3:
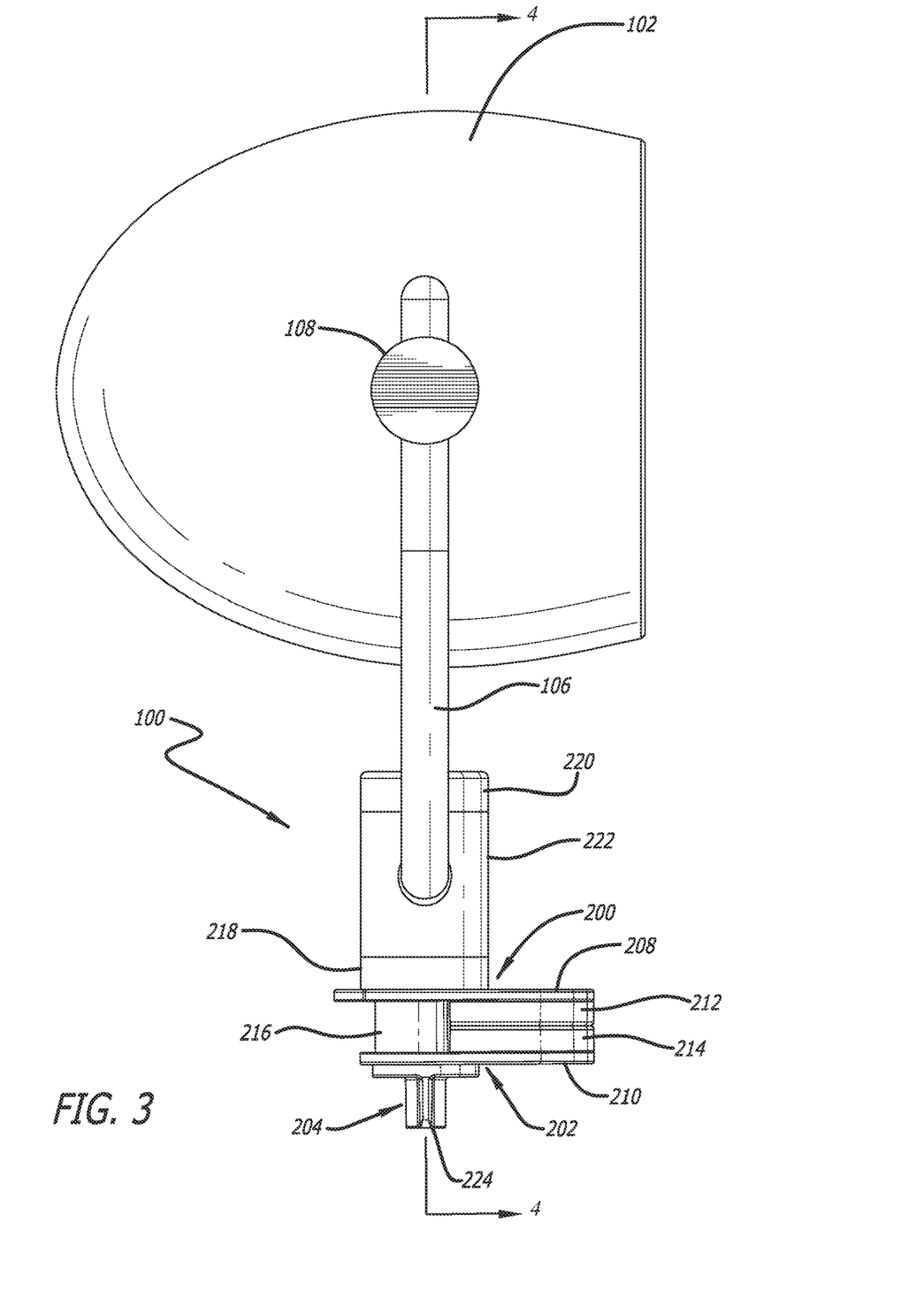
FIG. 3 illustrates a side view of the fan supported by the fan clamp of FIG. 1, with the fan clamp in the closed position.

FIG. 3 illustrates a side view of the fan 102 supported by the fan clamp 100 of FIG. 1, with the fan clamp 100 in a closed position. As discussed in connection with FIG. 2, the fan clamp 100 has a clamp assembly having three basic parts: the upper clamp member 200, lower clamp member 202 and screw adjustment mechanism 204. In all examples, the various parts that comprise the fan clamp 100 can be made of cast metals, plastic or other material suitable for the application.

As seen in FIG. 3, when the fan clamp 100 is in a closed position, the upper pad 212, attached to the underside of the upper plate 208, and the lower pad 214, attached to the upper side of the lower plate 210, meet. The shield 216 is affixed to the top side of the lower plate 214 and is positioned behind the upper pad 212 and lower pad 214 above the adjustment knob 224. The shield 216 extends between the upper plate 208 and lower plate 210.

In the current example, the cylindrical member 218 of the upper clamp member 200 is positioned above the shield member 216 on top of the upper plate 208 in axial alignment with the adjustment knob 224. The alignment of the shield member 216 above the adjustment knob 224 and below the cylindrical member 218 allows for the concealment of the screw 402 (FIG. 4) that forms part of the adjustment mechanism 204. The screw adjustment mechanism 204 allows the clamp assembly to move from an open position, as seen in FIGS. 1 and 2, to a closed position, as seen in FIG. 3. FIG. 3 also illustrates swing arm 106 rotatably attached to the cylindrical member 218 via sleeve 222. The fan 102 is then pivotally attached to the upper portion of the swing arm 106 by fan attachment 108.

Figure 4:
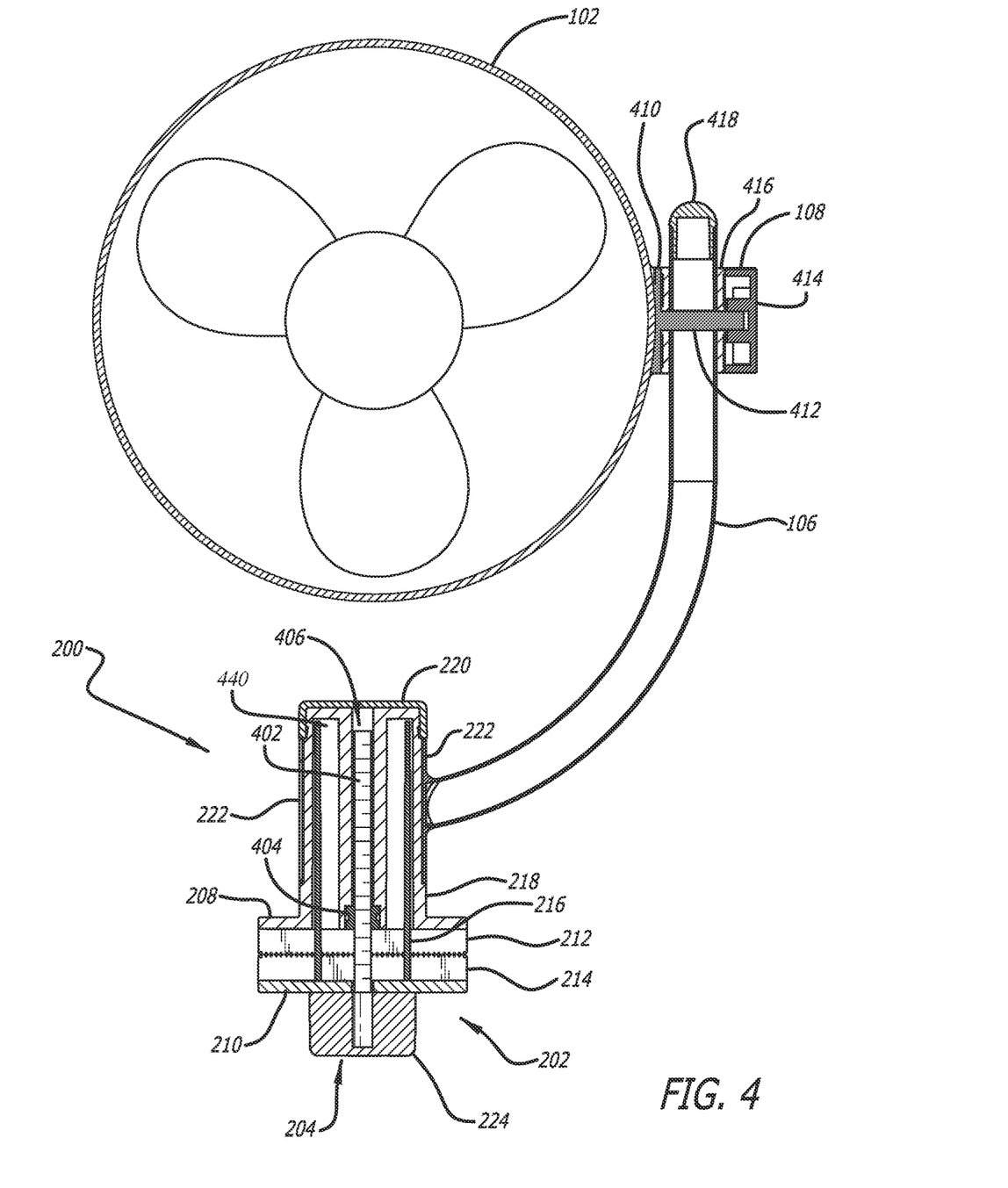
FIG. 4 illustrates a cross-section of the fan clamp of FIG. 3, taken along line 4-4 of FIG. 3, with the clamp in the closed position.

FIG. 4 illustrates a cross-section of the fan clamp 100 of FIG. 3, taken along line 4-4 of FIG. 3, showing the internal components of the fan clamp 100 when the fan clamp 100 in the closed position. As illustrated in FIG. 4, the screw adjustment mechanism 204 is attached to a screw 402 that extends substantially the length of the fan clamp 100. The upper clamp member 200 includes a circular cavity or channel 440 for receiving the shield member 216 as well as a cylindrical central cavity or shaft 406 for receiving the screw 402. A recess in the cylindrical member 218 also houses the threaded insert 404 that is positioned between the upper pad and the cylindrical member surrounding the opening of the cylindrical cavity 406.

The screw 402 is engaged by the threaded insert 404. The threaded insert 406 is designed to accept the screw 402 within the cylindrical cavity 406 and move the screw from an extended to retracted position as the adjustment knob 224 is turned. While the threaded insert 404 is shown in FIG. 4 to engage the screw 402, the shaft 406 could alternatively to be threaded.

As the screw 402 extends from a retracted to extended position by turning the adjustment knob 224 of the screw adjustment mechanism 204 in one direction, e.g., a counterclockwise direction, the lower clamp member 202 separates from the upper clamp member 200 to engage a support surface 104. Once the support surface is positioned between the upper pad 212 and lower pad 214, the adjustment knob 224 of the screw adjustment mechanism 204 is then turned in the opposing direction, e.g., a clockwise direction, to secure the fan clamp 100 against the support surface 104 between the upper pad 212 and lower pad 214 (as illustrated in FIGS. 1 and 2). As the screw 402 moves from a retracted to extended position, the shield 216 also moves with the lower pad 214 and screw to conceal the screw 402 as it moves. The screw 402 and lower clamp member 202, which includes shield 216, move together as the adjustment knob 224 is turned in either the clockwise or counterclockwise direction. In this example, the adjustment knob 224 may be a wing-nut type handle to allow for the tightening of the screw when clamping.

FIG. 4 also illustrates a cross-section of the fan attachment 108 of the swing arm 106. Fan attachment 108 includes a mounting plate 410 having a pivot pin 412 extending therefrom. The pivot 412 extends through the swing arm 106 and is engaged with an attachment cap 414. A sleeve 426 is also positioned between the attachment cap 414 and mounting plate 410 to hide the pivot pin 412 attachment to the swing arm 106. Swing arm 106 further includes an arm cap 418 that may be snapped onto the top of the swing arm 106 using, for example, a friction fit. The mounting plate 410 then attaches to the fan 102 to support the fan 100 on the swing arm 106.

Figure 5:
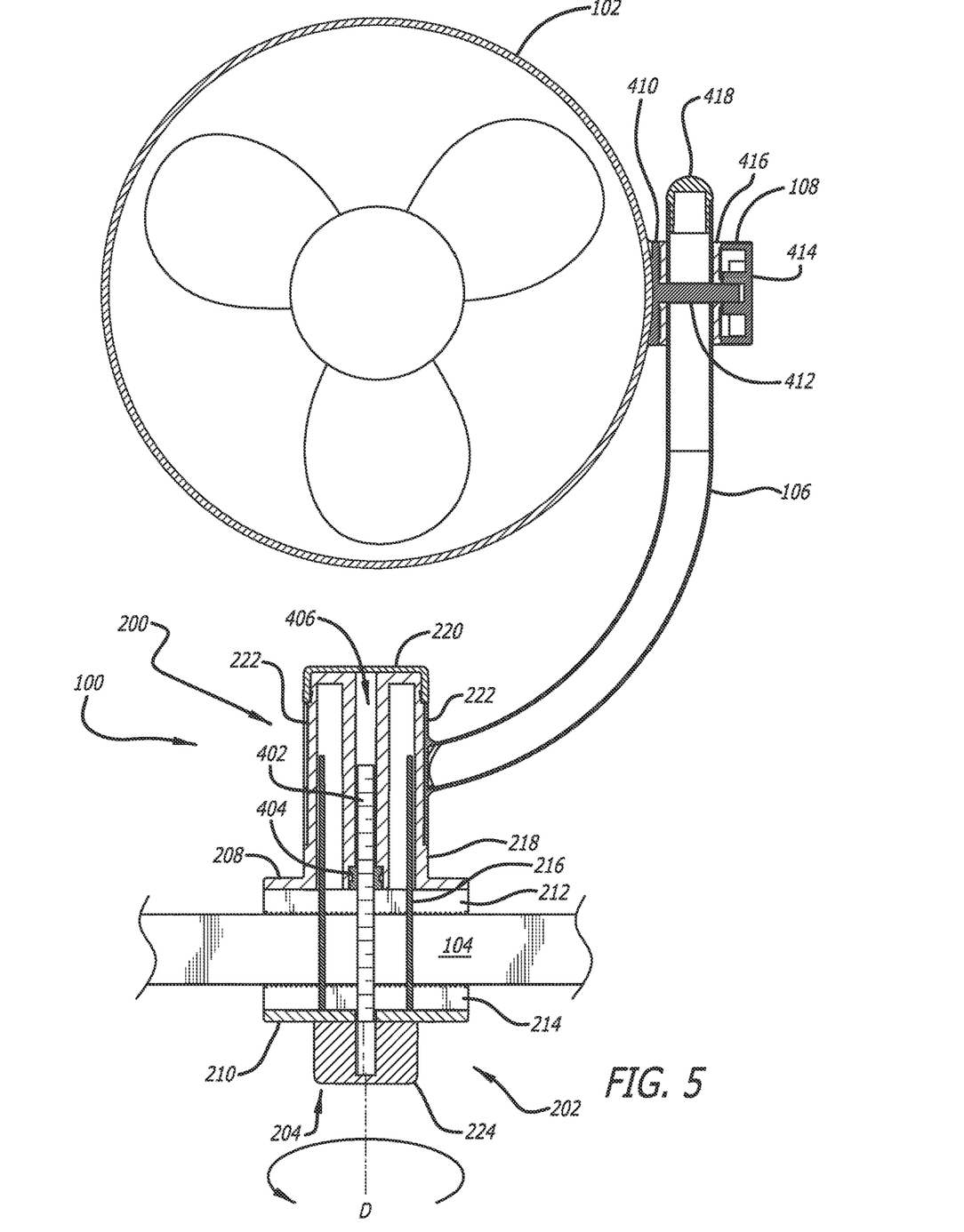
FIG. 5 illustrates a cross-section of the fan clamp of FIG. 2, taken along line 5-5 of FIG. 2, with the clamp in the open position and engaged with a support surface.

FIG. 5 illustrates a cross-section of the fan clamp 100 of FIG. 2, taken along line 5-5 of FIG. 2, with the clamp 100 in the open position and engaging a support surface 104. In FIG. 5, the lower clamp member 214 has been moved to an extended position by turning the adjustment knob 224 of the screw adjustment mechanism 204, for example, in a counterclockwise direction. FIG. 5 best illustrates the movement of the screw 402 and lower clamp member 202, including the shield 216 and lower pad 214 downward, to an extended position with the turning of the adjustment knob 224 in one direction. The screw 402 and lower clamp member 202, which includes the shield 216, move together with the adjustment knob 224. In the extended position, the lower clamp member 202 separates from the upper clamp member 200 to engage a support surface 104. The movement of the shield 216 with the lower clamp member 202 downward conceals the screw 402 as it moves.

In the illustrated example, the cylindrical member 218 is molded together with the upper plate 208, as one piece or a single unit with a cap. Alternatively, the cylindrical member 218 may be a separate piece affixed on top of the upper plate 208. While it is described as the cylindrical member 218 having the channel 440 for receiving the shield 216 and the shaft 406 for receiving the screw 402, if manufactured separately, the upper plate 208 would require corresponding channel 440 and shaft 406 for receiving the shield and screw. In this manner, the cylindrical member 218 is not limited to the construction illustrated in the attached figures, but may be designed more to cover the shield 216 and screw 402 coming through channel 440 and shaft 406 of the upper plate 208. In this matter, the shaft 406 in the upper plate may be threaded, may be a threaded insert 404 or may include a threaded insert 404 positioned on top of an opening in the upper plate 208.

Figure 6:
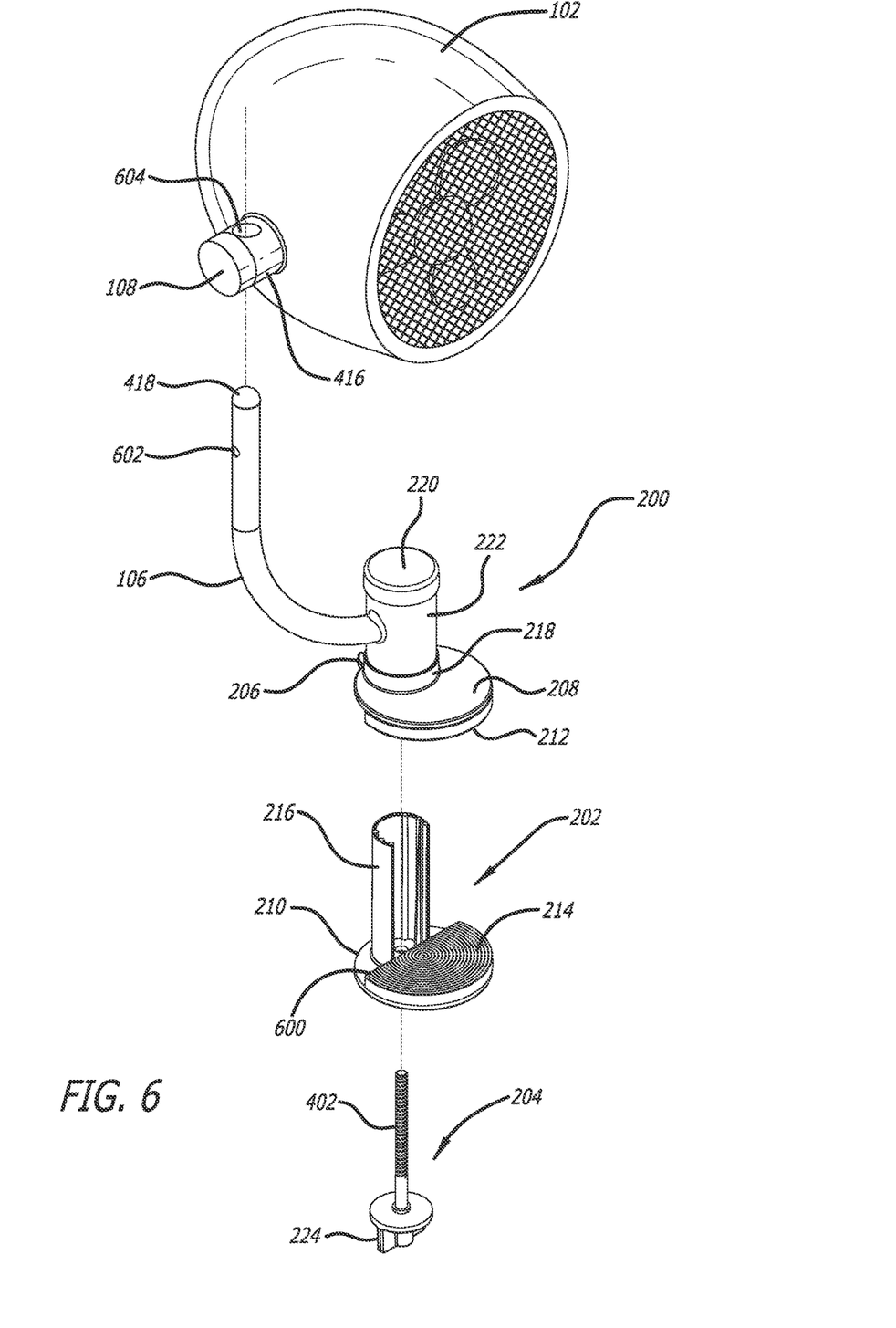
FIG. 6 is an exploded view of the fan clamp of the present invention.

FIG. 6 is an exploded view of the fan clamp 100 of the present invention. This figure best illustrates the shield member 216 positioned on top of the lower plate 210 behind the lower pad 214. Here, it is seen that the screw adjustment assembly includes the screw 402 attached at one end to the adjustment knob 224. The screw 402 is affixed to the top of adjustment knob 214, which causes and screw to turn with the turning of the adjustment knob 214.

The lower clamp member 202 includes a lower pad 214 affixed to the upper surface of the lower plate 210 and a C-shaped shield member 216 is positioned behind the lower pad 214 on the upper surface of the lower plate 210. The shield 216 is positioned to surround an opening in the lower plate 210 for receiving the screw 402 of the screw adjustment assembly 204 from the underside of the lower plate 210 of the lower clamp member 202.

As seen in FIG. 6, to prevent the screw 402 from being visible in use, the shield 216 positioned on the lower plate 210 surrounding the opening for receiving the screw 406 is taller than the thickness of the lower plate 210 with lower non-slip pad 214, together with the upper plate 208 with upper non-slip pad 212. More particularly, the shield must to tall enough to extend between the upper and lower plates 208, 210 as the plates move away from one another to engage a support surface 104, while still being maintained, at least partially, within the channel 440 of the upper plate 208 and cylindrical member 218.

In this manner, the shield 216 of the clamp assembly extends from the lower clamp assembly 202 through the upper clamp assembly 200 to partially surround the screw 402 on the side of the screw 402 opposite the lower pad 214 to block the screw 402 from being visible when the lower and upper clamp assemblies 200 and 204 engage a support surface 104.

FIG. 6 also illustrates a hole 602 in the swing arm 106, including includes an opposing hole (not shown) on the opposite side of the swing arm 106 for receiving the pivot pen 412 of the fan attachment 108. A passage 604 and the sleeve 416 of the fan attachment 108 is also illustrated in FIG. 6. for receiving the swing arm 106.

The foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

I claim:

1. A fan clamp comprising:
a screw adjustment assembly, the screw adjustment assembly having a screw attached at one end to an adjustment knob;
a lower clamp member having a lower plate with a lower pad affixed to an upper surface of the lower plate and a C-shaped tubular member positioned behind the lower pad on the upper surface of the lower plate, the C-shaped tubular member surrounding an opening in the lower plate for receiving the screw of the screw adjustment assembly from underside of the lower plate of the lower clamp member; and
a upper clamp member positioned opposite the lower clamp member, the upper clamp member including a upper plate having an upper pad affixed to a lower surface of the upper plate, the upper clamp member further including a cylindrical member positioned on a top side of the upper plate, the cylindrical member including C-shaped channel for receiving the C-shaped tubular member of the lower clamp member and a shaft for engaging the screw of the screw adjustment assembly, whereby a rotation of the adjustment knob moves the screw in the shaft to move the lower clamp member toward the upper clamp member when the adjustment knob is rotated in one direction and to move the lower clamp member away from the upper clamp member when the adjustment knob is rotated in the oppose direction.

2. The fan clamp of claim 1, wherein the cylindrical member includes a threaded insert surrounding a portion of the shaft for engaging the screw of the screw adjustment assembly.

3. The fan clamp of claim 1 further including a swing arm having a sleeve rotatably coupled to an outer circumference of the cylindrical member of the upper clamp member.

4. The fan clamp of claim 3 further including a fan attachment for pivotally attaching a fan to an end of the swing arm positioned away from the cylindrical member of the upper clamp member.

5. The fan clamp of claim 1 wherein the adjustment knob and cylindrical member of the upper clamp are axially aligned longitudinally.

6. The fan clamp of claim 1 wherein the lower pad and upper pad include a non-slip surface.

7. The fan clamp of claim 1 wherein the upper clamp member includes a cord cleat.

8. A fan clamp comprising:
a screw attached at one end to an adjustment knob;
a lower plate member having a lower non-slip pad attached on a top surface of the lower plate member, wherein the lower plate member includes an opening for receiving the screw;
an upper plate member having an upper non-slip pad attached on a bottom surface of the upper plate, where the upper plate further includes a threaded shaft for receiving the screw; and
a shield positioned on the lower plate member surrounding the opening for receiving the screw, the shield being taller than a thickness of the lower plate member plate with lower non-slip pad and upper plate member with upper non-slip pad combined, wherein the upper plate member further includes a channel opening for receiving the shield such that the shield remains extended between the upper and lower plate members as the lower plate member move toward and away from one another.

9. The fan clamp of claim 8 wherein the upper plate member includes a cord cleat.

10. The fan clamp of claim 8 wherein the upper plate member includes an opening for receiving the screw and where the threaded shaft is positioned above the opening.

11. The fan clamp of claim 10 wherein the threaded shaft is a threaded insert.

12. The fan clamp of claim 8, further including a cylindrical member positioned on a top of the upper plate member for receiving the shield and screw as the cylindrical member that extend through the channel opening on the upper plate member and threaded shaft for receiving the screw.

13. The fan clamp of claim 12 further including a swing arm rotatably coupled to an outer circumference of the cylindrical member with a circular sleeve so that the swing arm may swivel about the cylindrical member.

14. The fan clamp of claim 13 further including a fan attachment for attaching a fan to an end of the swing arm positioned away from the cylindrical member.

15. A fan clamp for supporting a fan on a support surface by clamping to the support surface, the fan clamp comprising:
a clamp assembly comprising:
an upper clamp assembly for engaging a top side of the support surface;
a lower clamp assembly for engaging a bottom side of the support surface;
a screw adjustment assembly extending through the lower and upper clamp assemblies for clamping the upper clamp assembly and lower clamp assembly to the support surface;
a shield extending from the lower clamp assembly through the upper clamp assembly that partially surrounds the screw adjustment assembly to block the screw adjustment assembly from being visible when the lower and upper clamp assemblies move away from each other to engage the support surface; and
an arm extending from the clamp assembly for supporting a fan.

16. The fan clamp of claim 15 wherein the upper clamp assembly and lower clamp assembly each include a non-slip pad surface.

17. The fan clamp of claim 15 wherein the shield is a C-shaped tubular member.

18. The fan clamp of claim 15 where the upper clamp assembly includes a cylindrical member and where the arm includes a circular sleeve that is rotatably coupled to an outer circumference of the cylindrical member so that the arm may swivel about the cylindrical member.

* * * * *